(12) United States Patent  (10) Patent No.: US 8,834,027 B2
Zeidan  (45) Date of Patent: Sep. 16, 2014

(54) DAMPER HAVING MODULAR FLEXIBLE LIGAMENTS AND VARIABLE GAPS

(76) Inventor: Fouad Y. Zeidan, Pearland, TX (US)

( * ) Notice: Subject to any disclaimer, the term of this patent is extended or adjusted under 35 U.S.C. 154(b) by 518 days.

(21) Appl. No.: 13/005,997

(22) Filed: Jan. 13, 2011

(65) Prior Publication Data

US 2012/0181734 A1    Jul. 19, 2012

(51) Int. Cl.
  F16C 27/00    (2006.01)
  F16C 32/06    (2006.01)
  F16F 15/121    (2006.01)

(52) U.S. Cl.
  CPC .................................. F16F 15/1215 (2013.01)
  USPC ............................................ 384/99; 384/117

(58) Field of Classification Search
  CPC ....... F01D 25/164; F01D 25/16; F01D 25/20; F01D 21/045; F01D 25/125; F01D 25/166; F01D 25/168; F16F 15/126; F16F 15/0237; F16F 15/1442; F16F 15/06; F16F 15/13453; F16F 15/023; F16F 15/139; F16F 15/145; F16F 15/30; F16F 7/10
  USPC ........... 74/572.1, 573.12, 574.4; 384/99, 117; 464/89; 267/136
  See application file for complete search history.

(56) References Cited

U.S. PATENT DOCUMENTS

| | | |
|---|---|---|
| 1,349,157 A | 8/1920 | Albert |
| 1,541,411 A | 6/1925 | Davis |
| 2,197,432 A | 4/1940 | Kingsbury |
| 2,744,799 A | 5/1956 | Howarth |
| 2,778,696 A | 1/1957 | Lease |
| 2,834,226 A * | 5/1958 | Hirst .............................. 74/574.4 |
| 2,986,431 A | 5/1961 | Block et al. |
| 3,160,450 A | 12/1964 | Gentilnomo |
| 3,353,632 A * | 11/1967 | Perhach ......................... 188/268 |
| 3,512,854 A | 5/1970 | Harbage |

(Continued)

FOREIGN PATENT DOCUMENTS

| | | |
|---|---|---|
| EP | 1927769 A2 | 6/2008 |
| EP | 2060805 A1 | 5/2009 |

(Continued)

OTHER PUBLICATIONS

ISR received by Applicant in co-pending PCT application having serial No. PCT/US2012/021324; dated Aug. 22, 2012 received by Applicant on or around Sep. 5, 2012; submitted in its entirety.

(Continued)

*Primary Examiner* — Christopher Schwartz
(74) *Attorney, Agent, or Firm* — Hamilton IP Law, PC; Jay R. Hamilton; Charles A. Damschen

(57) ABSTRACT

A module flexible ligament damper includes an cylindrical inner structure with a central axis and an outer cylindrical surface. An outer casing with an inner cylindrical surface is positioned around the inner structure. A modular ligament with an inner flange and an outer flange connected by a web is positioned between the inner structure and the casing. The inner flange is connected to the inner structure and the outer flange is connected to the casing to support the inner structure within the casing, and to permit free orbital movement of the inner structure on a plane perpendicular to the axis of the inner structure. In one embodiment, the web is straight but does not intersect the axis of the inner structure for flexing in a radial direction. In other embodiments, the web is curved for radial flexing.

19 Claims, 8 Drawing Sheets

(56) References Cited

U.S. PATENT DOCUMENTS

| | | | |
|---|---|---|---|
| 3,837,178 A | 9/1974 | Hackforth et al. | |
| 3,859,868 A | 1/1975 | Post | |
| 3,909,587 A | 9/1975 | Mattis | |
| 4,026,613 A | 5/1977 | Moravchik | |
| 4,239,300 A | 12/1980 | Adler | |
| 4,335,925 A | 6/1982 | Stopp | |
| 4,421,426 A | 12/1983 | Furukawa | |
| 4,473,310 A | 9/1984 | Advani et al. | |
| 4,793,722 A * | 12/1988 | Jensen | 384/99 |
| 5,012,694 A * | 5/1991 | McGrath | 74/572.11 |
| 5,124,605 A | 6/1992 | Bitterly et al. | |
| 5,156,379 A | 10/1992 | Tabata | |
| 5,186,077 A * | 2/1993 | Nakane | 74/574.4 |
| 5,205,653 A | 4/1993 | Veronesi et al. | |
| 5,352,157 A * | 10/1994 | Ochs et al. | 464/89 |
| 5,353,640 A | 10/1994 | Jiang et al. | |
| 5,415,061 A | 5/1995 | Kohno | |
| 5,603,574 A * | 2/1997 | Ide et al. | 384/117 |
| 5,613,781 A * | 3/1997 | Kuzdzal et al. | 384/99 |
| 5,816,114 A | 10/1998 | Gregoire et al. | |
| 5,954,480 A | 9/1999 | Schmaling et al. | |
| 6,170,989 B1 | 1/2001 | Zeidan | |
| 6,379,046 B1 | 4/2002 | Zeidan | |
| 6,565,257 B1 | 5/2003 | Kennedy et al. | |
| 6,746,152 B2 | 6/2004 | Branagan | |
| 6,766,697 B1 | 7/2004 | Perez et al. | |
| 6,767,133 B2 | 7/2004 | New | |
| 7,625,121 B2 * | 12/2009 | Pettinato et al. | 384/99 |
| 7,682,084 B2 | 3/2010 | Yoshimura et al. | |
| 8,156,842 B2 * | 4/2012 | Movlazada | 74/574.4 |
| 2003/0021503 A1 | 1/2003 | Branagan | |
| 2003/0153419 A1 | 8/2003 | Hodjat et al. | |
| 2005/0047690 A1 | 3/2005 | Keramati et al. | |
| 2009/0268995 A1 | 10/2009 | Ide et al. | |
| 2009/0304313 A1 | 12/2009 | Ertas | |

FOREIGN PATENT DOCUMENTS

| | | |
|---|---|---|
| JP | 57000042 A | 1/1982 |
| JP | 60252186 A | 12/1985 |
| JP | 61184805 A | 8/1986 |
| JP | 03149411 A | 6/1991 |
| JP | 6023672 A | 2/1994 |
| JP | 6323505 A | 11/1994 |
| JP | 09303382 A | 11/1997 |
| JP | 11351243 A | 12/1999 |
| JP | 2003232339 A | 8/2003 |
| JP | 2009257445 A | 11/2009 |
| JP | 2010151283 A | 7/2010 |
| KR | 19980040214 A | 8/1998 |
| KR | 20030016246 A | 2/2003 |
| RU | 2038516 C1 | 6/1995 |

OTHER PUBLICATIONS

Ettles, C.; The Development of a Generalized Computer Analysis for Sector Shaped Tilting Pad Thrust Bearing; Tribology, Apr. 2, 1976.

* cited by examiner

DAMPER HAVING MODULAR FLEXIBLE LIGAMENTS AND VARIABLE GAPS

BACKGROUND OF THE INVENTION

1. Field of the Invention

The invention broadly relates to dampers, and more particularly to dampers which dampen the orbital motion of rotating shafts.

2. Prior Art

Dampers are used to dampen the vibratory motion in a rotating shaft and reduce the amount of unbalanced forces transmitted to a casing or foundation. Squeeze film dampers utilize a small, oil-filled annular gap between a structure which supports the rotating shaft, and a casing which has an inner cylindrical diameter. The orbital motion of the shaft causes relative motion between the structure and the casing, which changes the shape of the gap in a manner which squeezes an oil film within the gap. This builds pressure that results in a damping force. The casing and the structure are usually separated by a centering spring that offsets the static weight of the rotating shaft. In a conventional damper, the spring is comprised of a squirrel cage connecting the casing and the structure. Such a spring is not optimal because the damper, which tends to be very long, must somehow be configured to fit within a very short axial length.

A device referred to as an integral centering spring squeeze film damper provides a solution to the axial space limitation by taking advantage of wire EDM techniques. The casing, the structure, and the centering spring are made from one integral piece of material. This design results in significant cost savings, but requires special material due to the stresses in the spring itself. In addition, the squeeze film annulus is limited in sizes to 0.012 inches and larger due to the practical limitations of the EDM process. Furthermore, the removing of the material and the characteristically thin sections involved often cause distortions which make it difficult to control the size and shape of the oil annulus and thus the relative positions of the structure and the casing. Further, inspection of the integral centering spring is difficult due to the one-piece construction and the narrow annulus. Still further, the highly stressed areas of the spring are recessed deep within the narrow annulus, so that it is impossible to shot peen or inspect it using NDT methods. Also, after extended use, it is often difficult to clean the narrow oil passages due to the limited access. Also, the residual stresses which result from the wire EDM process can cause dislocation of the structure relative to the case. In order to avoid excessive warping, it is often necessary to provide a relaxation period for the stresses to subside before the bore profile is cut. The wire EDM process causes a damper to lose concentricity since the movement of the inner structure during the relaxation period makes it difficult to find the center of the bore. This results in an additional manufacturing step where the outside diameter of damper is machined or ground concentric to the inside diameter. This also makes it difficult to repair these dampers.

BRIEF SUMMARY OF THE INVENTION

Therefore, what is needed is a rotating shaft damper which increases manufacturability and serviceability, and improves inspectability, ease of cleaning, adjustability, and design freedom.

Accordingly, the present modular flexible ligament damper includes an cylindrical inner structure and an outer casing. The inner structure has a central axis and an outer cylindrical surface. The outer casing has an inner cylindrical surface. The structure is supported by at least one modular ligament. The ligament has an inner and an outer flange connected by at least one web. The inner flange connects to the structure and the outer flange connects to the casing in a manner which supports the structure within the casing and which permits substantially free orbital movement of the structure. The support and the permitted movement are in a plane, which is substantially perpendicular to the axis of the structure.

In another feature of the invention, at least one shim is disposed between the inner flange and the structure in order to adjust the relative position of the casing and the structure.

In another feature of the invention, at least one shim is disposed between the outer flange and the casing in order to adjust the relative position of the casing and the structure.

In another feature of the invention, an annulus is formed between the outer cylindrical surface of the structure and the inner cylindrical surface of the casing. The annulus is filled with a fluid, which dampens the orbital movement of the structure.

In another feature of the invention, fasteners and locating components connect and align the inner flange to the structure and the outer flange to the casing, thus permitting disassembly and accurate reassembly of the damper.

In another feature of the invention, the locating components are cylindrical pins oriented perpendicular to the axis of the structure.

In another feature of the invention, the outer flange, inner flange, and the at least one web are integrally formed.

An advantage achieved with the present invention is that the modular ligament design allows interchangeability and replacement of support ligaments in the field. Moreover, this design permits the use of softer and weaker pad material while using a strong high endurance limit steel modular ligament for support.

Another advantage achieved with the present invention is that dampers with these ligaments can be manufactured in a cost effective way for large sizes.

Another advantage is that the shape of the annulus can be changed after manufacture, which is not possible with the integral design.

Another advantage is that adjustment shims can be inserted under the ligament thus allowing precise control of clearance and eccentricity.

Another advantage is that the ligament can be accessed for inspection, stress-relieving shot peening, and for removing all the sharp edges.

Another advantage is that a special build of the ligament can allow axial tilt capability that is necessary, or at least beneficial, in many rotating equipment applications.

Another advantage is that this ligament design allows an adjustable limit to the amount of axial tilt. The ligament may also be designed to limit the tilt in the circumferential direction.

Another advantage is that the ligament can be arranged to provide a plurality of different spring rates.

Another advantage is that this interface between the ligament and the casing or support structure can also allow for thermal expansion in the radial direction.

Another advantage is that, since the ligament is not made by the wire EDM process, wire cutting is not necessary and residual stresses are avoided.

Another advantage is that the ligament design, in spite of resulting in more components, provides lower manufacturing tolerances stack up, thus reducing overall cost.

DETAILED DESCRIPTION OF THE INVENTION

Figure 1:
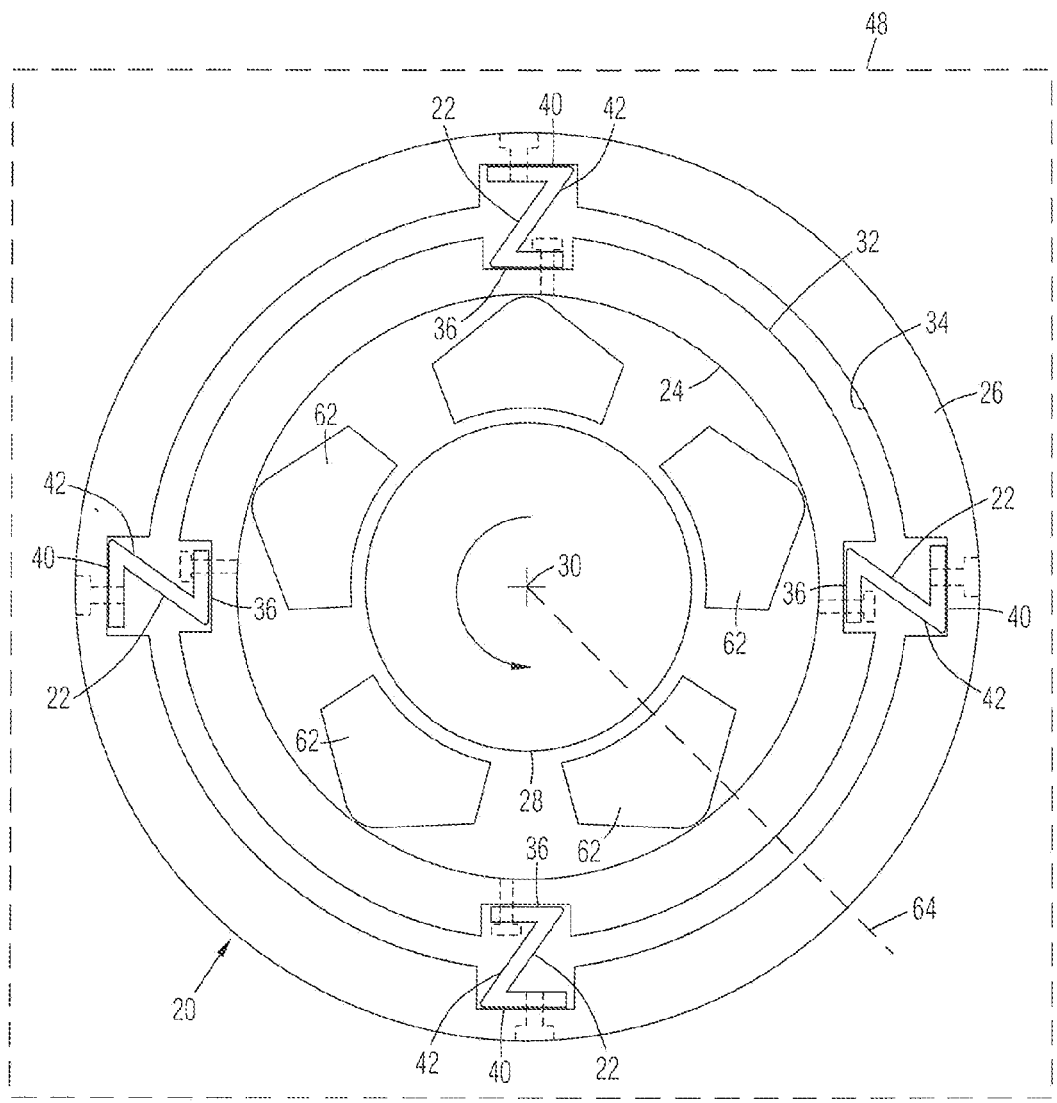
FIG. 1 is an end view, partially in section, of an embodiment of the invention.

In accordance with a first embodiment of the present invention in FIG. 1, a damper 20 includes modular flexible ligaments 22, an inner structure 24, and an outer casing 26. The inner structure 24 has a central axis 30 and an outer cylindrical surface 32. The outer casing 26 has an inner cylindrical surface 34. The structure 24 is supported by the modular ligaments 22. The ligaments 22 have an inner and an outer flange 36 and 40, respectively, connected by a web 42. The inner flange 36 connects to the structure 24 and the outer flange 40 connects to the casing 26 in a manner which supports the structure within the casing and which permits substantially free orbital movement of the structure. The support provided by the ligaments 22 and the permitted movements are in a damping plane 48, which is substantially perpendicular to the central axis 30 of the structure 24.

The ligaments 22 are preferably made with a high fatigue strength material, such as high strength aircraft quality alloy steel which has been heat treated for improved fatigue strength. The ligaments are preferably ground for precision control of height and thickness.

As shown for the illustrative embodiment of a damper 20 pictured in FIG. 1, the ligaments 22 may be arranged such that each ligament 22 extends only around a portion of the periphery of the inner structure 24. Specifically, in this illustrative embodiment of a damper 20 the damper 20 may include four ligaments 22 equally rotationally offset with respect to one another such that adjacent ligaments 22 are rotationally spaced by approximately 90 degrees from one another.

Figure 2A:
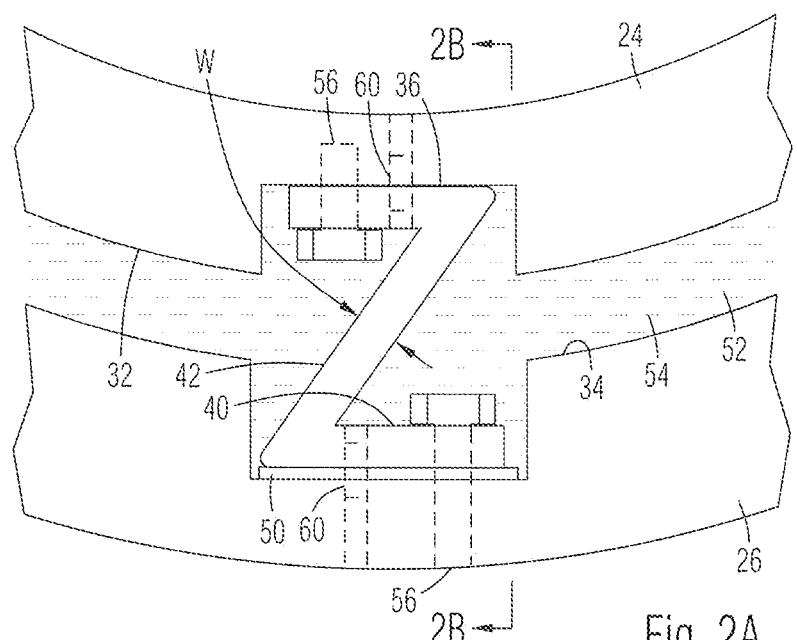
FIG. 2A is a cutaway view of a ligament assembly of the present invention.

As shown in FIG. 2A, shims 50 may be disposed between the outer flange 40 and the casing 26 as shown, or between the inner flange 36 and the structure 24 to adjust the relative position of the casing and the structure for precise control of clearance, preload, axial taper, and pre-tilt. Such modular ligaments 22 can be replaced in the field, machined using conventional manufacturing methods, or removed for NDT inspection. Further, ligaments 22 are easily shot-peened to remove residual stresses caused by wire EDM, laser, or conventional machining processes.

An annulus 52 is formed between the outer cylindrical surface 32 of the structure 24 and the inner cylindrical surface 34 of the casing 26. The annulus 52 is filled with a fluid 54, which dampens the orbital movement of the structure 24.

Fasteners 56 and locating components 60 connect and align the inner flange 36 to the structure 24 and the outer flange 40 to the casing 26, thus permitting disassembly and accurate reassembly of the damper 20, which allows each ligament 22 to be selectively engageable with both the inner structure and the casing. The locating components 60 are preferably cylindrical pins oriented generally perpendicularly to the axis 30 of the structure 24. The outer flange 40, inner flange 36, and the web 42 are integrally formed.

Figure 2B:
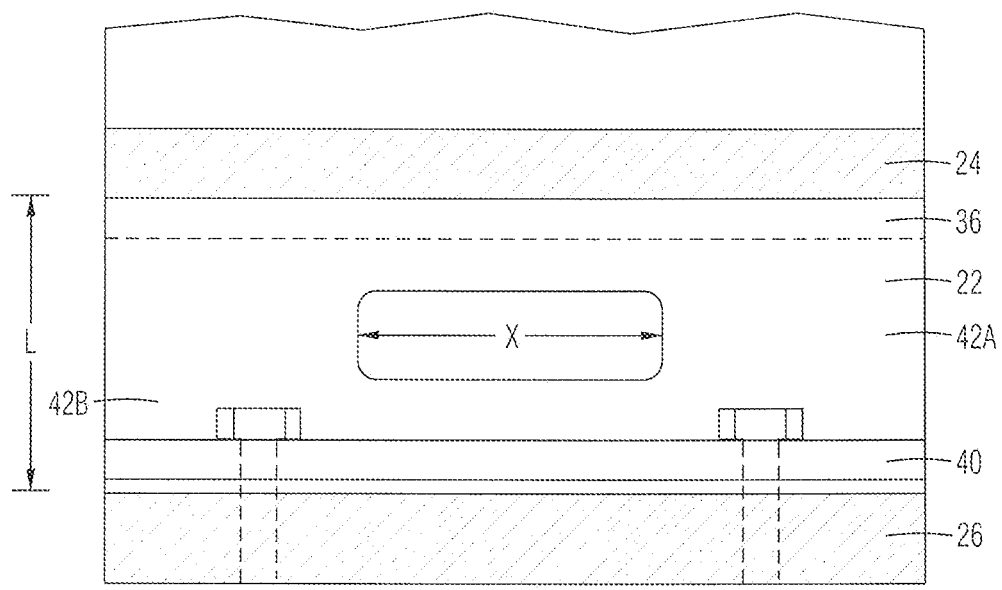
FIG. 2B is a cutaway view of the ligament assembly taken along line 2B-2B in FIG. 2A.

As shown in a side cutaway view FIG. 2B, the ligament 22 may optionally be comprised of two or more webs 42A and 42B separated by a distance X to permit fluid to flow therebetween and vary the amount of damping. The webs 42A and 42B extend outward from the inner flange 36 to the outer flange 40 so as to support the structure 24 in the casing 26. Each web 42A and 42B has a radial length L and a circumferential width W. The radial length L is greater than the circumferential width W. Under load during operation of the damper 20, each web 42A and 42B flexes so that the shaft 28 may oscillate relative to the casing 26. The freedom of oscillation or damping can be varied by changing, among other things, the length, the width, and the number of the webs 42 in each ligament 22. The separation between webs 42A and 42B may be a perforation that permits oil or other fluid to pass between opposite sides of the web for improving heat transfer away from hot areas of the inner structure during operation of the bearing. The perforation is preferably symmetrically formed in the web 42 to yield consistent and predictable flexural characteristics. An advantage of this embodiment is that flexibility is increased without increasing assembly costs. In addition, the perforation may be a round hole which naturally reduce stress in the web 42.

The flexing of the webs 42 and the ability to shim each ligament 22 are extremely important in the formation of an optimal converging wedge of a bearing, and is also important for optimal operation of a tilt pad bearing 62 which engages and supports the shaft 28, as shown in FIG. 1. The more elastic the webs 42 are in the plane 48, combined with compressive rigidity in a second plane 64 extending radially from the axis 30 of the shaft 28, the lesser the fluid dynamic forces which apply to the shaft 28. The less forces which are applied the shaft 28, the less the deflection or flexing of the shaft 28. Dynamic deflection or flexing of the shaft 28 is undesirable because this cause premature wear of the bearing 62. Further, shimming a ligament 22 allows the formation of a more optimal converging wedge between the bearing 62.

Figure 3:
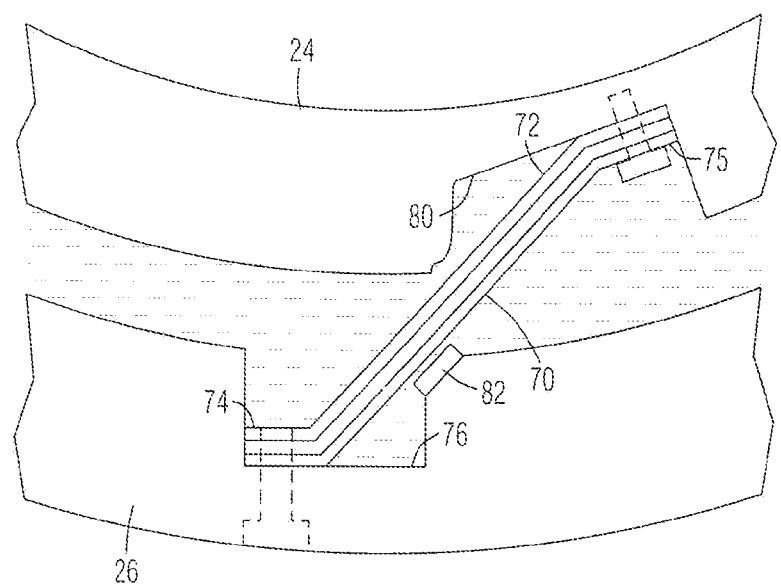
FIG. 3 is a cutaway view of an alternative embodiment of the present invention.

In an alternative embodiment shown in FIG. 3, a ligament 70 with a dual resistance and which is made up of multiple laminations 72 is provided. Laminations 72 have major surfaces which are substantially perpendicular to a tangent of a pad surface. One end 74 is fastened to a channel 76 in the casing 26 and the other end 75 is fastened to a channel 80 is the structure 24. In a first resistance mode, the ligament 70 experiences little spring resistance to deflection. After a certain amount of buckling or deflection occurs, an intermediate portion of the ligament 70 contacts a buckling restraint 82, thus increasing the damper's resistance to further buckling or deflection in a first buckling mode. Restraint 82 may be comprised of a stop as shown to limit buckling toward the restraint, or it may be comprised of a fastener with an enlarged head extending through the intermediate portion of the ligament to limit buckling in the opposite direction away from the restraint. Additional restraints may be provided to control a second buckling mode as well. By providing an alternative, less rigid path for deflection, the ligament 70 reduces the rotor deflection at the center span, thus increasing the life of the bearing which it supports. An advantage of this embodiment is that the resistance of the ligament 70 to flexing is reduced to provide a higher stiffness or bi-linear spring support while a high resistance to bucking is maintained.

Figure 4:
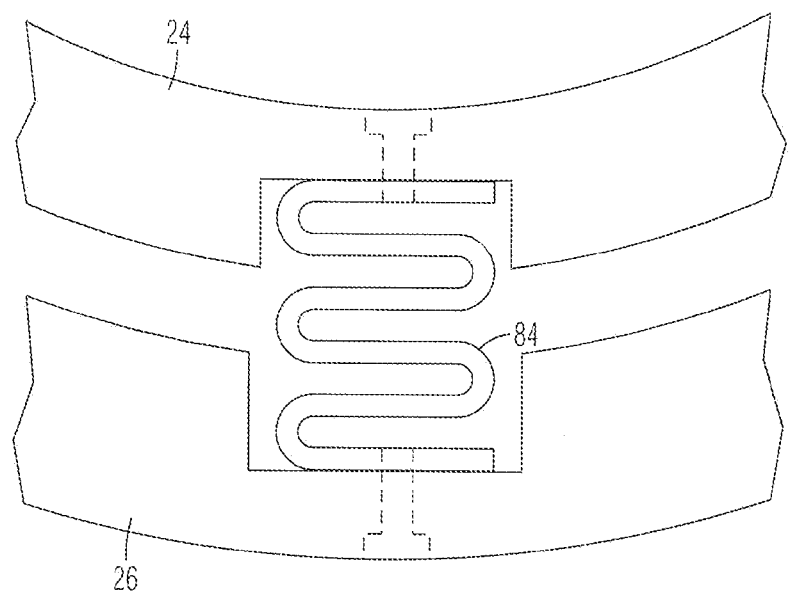
FIG. 4 is a cutaway view of an alternative embodiment of the present invention.

In FIG. 4, an alternative embodiment of the invention includes an accordion-shaped ligament 84. This further increases the flexibility of the ligament 84 thus increasing its ability to create an optimal converging web in the bearing. Alternatively, the ligament may be Z-shaped, L-shaped, S-shaped, or any other shape that flexing in a radial direction relative to the axis of the inner structure 24. In embodiments where the ligament has a straight web, such as in FIG. 1, the web does not intersect the axis of the damper to permit flexing. If the web is straight and intersects the axis of the damper, the web cannot flex in a radial direction, and thus cannot permit orbital motion in the inner structure. In other embodiments, the ligament is curved to permit flexing. Such ligaments also absorb size changes due to permit thermal expansion.

Figure 5:
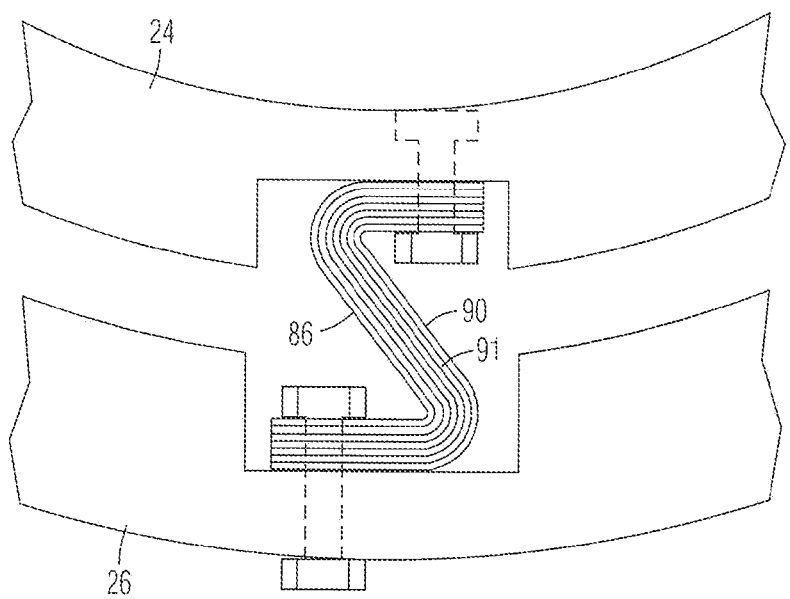
FIG. 5 is a cutaway view of an alternative embodiment of the present invention.

In FIG. 5, an alternative embodiment of the invention includes a ligament 86 comprised of laminates 90 and 91. The laminate 90 is preferably a spring material, and the laminate 91 is preferably an elastomer. This composite further increases the flexibility of the ligament 86 and damping through internal friction between the laminate 90 and 91, and facilitates providing a converging web in the bearing 62.

Figure 6:
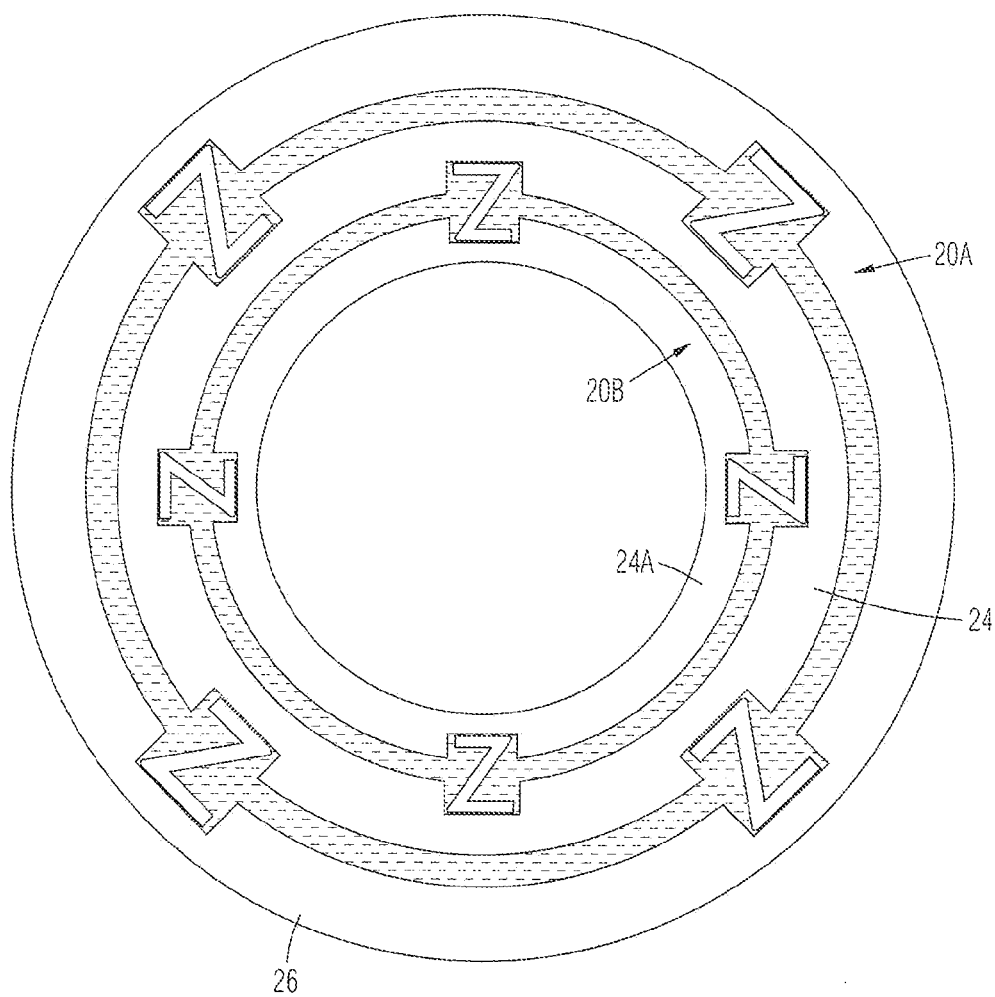
FIG. 6 is a cutaway view of an alternative embodiment of the present invention.

In FIG. 6, nested dampers 20A and 20B are arranged to increase the flexibility in the damping plane and thus improve the quality of the resulting converging wedge and reduce the non-linearity often associated with dampers. An additional support structure 24A is positioned within the support 24 to provide two layers of ligaments. Any embodiment of the ligament may be used. Such a configuration significantly increases the total damping capability of the assembly. To ensure uniform and symmetrical damping, the ligaments are evenly distributed around the periphery of the inner structure and on the inner diameter of the casing.

Figure 7:
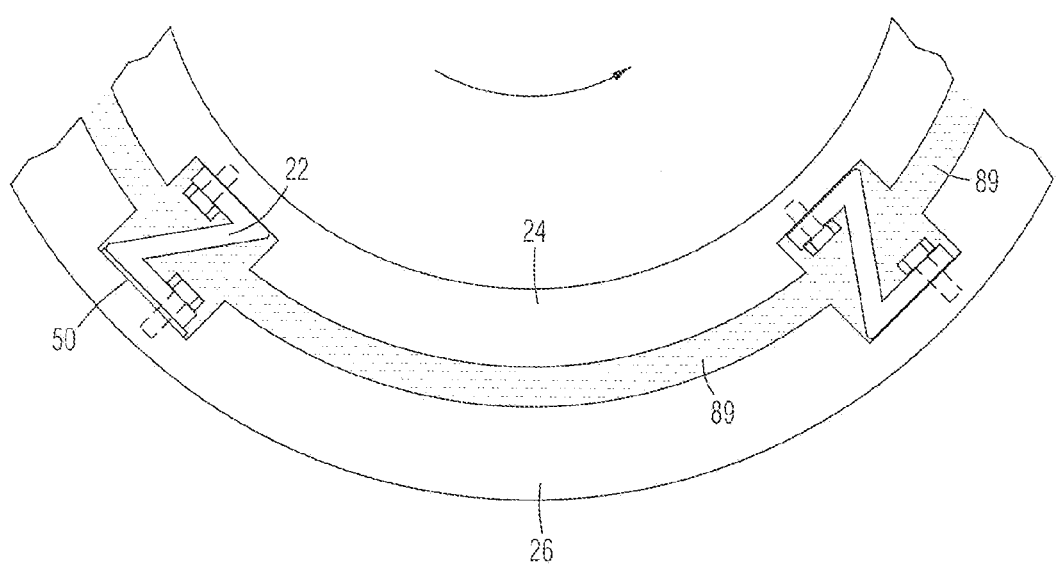
FIG. 7 is a cutaway view of an alternative embodiment of the present invention.

In FIG. 7, the damper 20 is shown in operation. Shims 50 may be placed between the ligaments 22 and the casing 26 to adjust the relative position of the structure 24 to provide an improved converging wedge. Because the ligament 22 need not be as long as the entire damper 20, fluid may flow between adjacent cavities 89. Holes (not shown) may also be drilled through the ligament 22 to permit fluid to flow through.

Figure 8A:
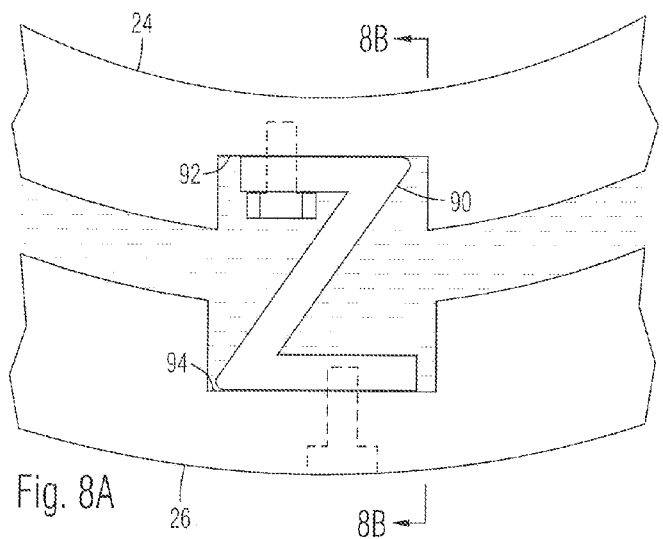
FIG. 8A is a cutaway view of an alternative embodiment of the present invention.
Figure 8B:
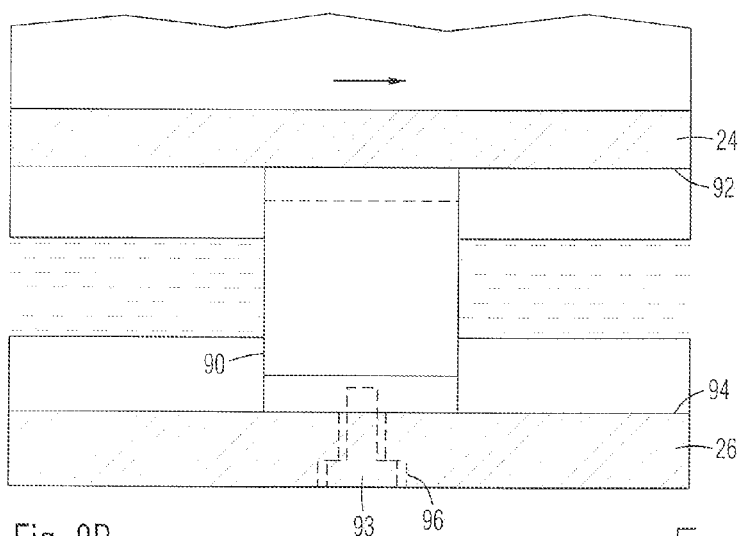
FIG. 8B is sectional view of the alternative embodiment in FIG. 8A taken along line 8B-8B.
Figure 8C:
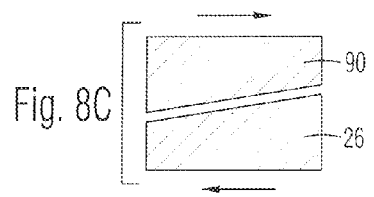
FIG. 8C is an exaggerated cutaway view illustrating the taper of the embodiment in FIG. 8A.

In FIGS. 8A and 8B, an alternative embodiment is shown with ligaments 90 which is positioned along tapered channels 92 and 94 in the support 24 and the casing 26, respectively. Tapered channels 92 and 94 provide adjustability and eliminate the need for shims to control the position of the support within the casing. Lateral repositioning is permitted by fastening the ligament 90 with a fastener 93 in a slot 96 which is aligned with the channels 92 or 94 and then axially displacing the casing 26 with respect to the structure 24. As shown in FIG. 8C, which is an exaggerated view of the interface between the ligament 90 and a tapered channel 92 or 94, lateral movement along tapered channels causes the height of the assembly to change. This closes or opens the squeeze film gap or clearance. Such adjustment is not possible with the integral design of the prior art.

Figure 9:
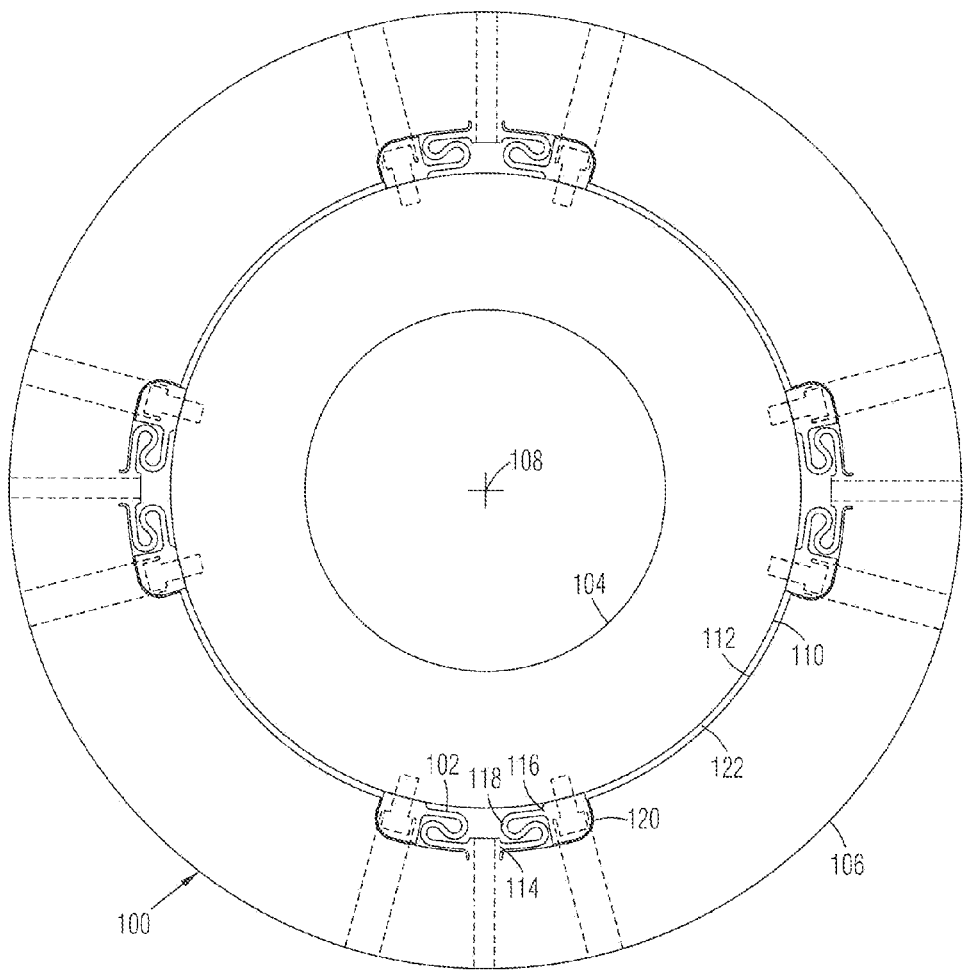
FIG. 9 is an end view of an alternative embodiment of the present invention.

In FIG. 9, an alternative embodiment is shown wherein a damper 100 includes modular flexible ligaments 102. The damper 100 includes an inner structure 104 and an outer casing 106. The inner structure 104 has a central axis 108 and an outer cylindrical surface 110. The outer casing 106 has an inner cylindrical surface 112. The inner structure 104 is supported by the ligaments 102. The ligaments 102 each has an outer end 114 integrally connected to inner cylindrical surface 112 of outer casing 106, and an inner end 116 bolted or otherwise attached to outer cylindrical surface 110 of inner structure 104. The outer end 114 and inner end 116 of ligament 102 are connected by a resilient web 118, which is preferably S-shaped. The ligaments 102 are positioned in recesses 120 on inner cylindrical surface 112 of outer casing 106 to minimize the gap 122 between outer casing 106 and inner structure 104. The inner end 116 is connected to the inner structure 104 and the outer end 114 is connected to the casing 106 in a manner which supports the structure 104 within the casing 106 and which permits substantially free orbital movement of the structure 104. In this embodiment, the ligament 114 is integral with the outer housing or base ring 106 only and shims 50 can be inserted between the inner cylinder 110 and the ligament flange 116. A shim (such as shown in FIG. 2A) can be added between inner end 116 and the outer surface 110 of inner structure 104 to compensate for the static weight of the rotor and the inner structure 104, or to adjust the gap 122. Alternatively, the inner end 116 can be integral with the inner structure 104, and the shim may be positioned between inner end 116 and the outer casing 106.

An advantage of the present invention is that modular ligaments 22 are removable and allow interchangeability of the ligaments in the field. This permits the damper 20 to be manufactured in a cost effective way, particularly for larger sizes. Economical manufacture is very difficult with the prior art integral design due to size limitations and the cost associated with wire EDM or laser cutting a large bearing support structure (larger than 6 inches inner diameter). Using the modular ligaments 22, the casing 26 or the tilt pad bearing 62 need not be made from the same high fatigue strength materials as the ligaments. Instead, the inner structure 24 and casing 26 may be made from more economical materials.

Another advantage is that the ligament 22 allows easy access for instrumentation such as strain gauges and temperature detectors, which is not possible or very difficult with conventional one-piece designs.

Another advantage is that individual ligaments 22 may be removed and reworked and, once assembled, the inner structure 24 may all be machined at once. The present damper is thus easier to repair.

Another advantage is that although the modular ligaments 22 result in more components, they enable the fabrication of the damper 20 with lower manufacturing tolerances stack up, so that overall cost is reduced. Once all the components are assembled, the bore of the inner structure 24 is cut in the final step, thus eliminating all the manufacturing tolerances.

Another advantage is that the ligament 22 can flex axially to provide better alignment with the shaft 28.

Another advantage is that the offset or relative position of the inner structure 24 can be changed after manufacture, which is not possible with the prior art integral dampers. This is accomplished by taking the inner structure 24 out of the casing 26 and re-doweling the ligaments 22 to achieve the desired offset or realignment.

Another advantage is that adjustment shims 50 (FIGS. 2A and 7) can be inserted between the inner structure 24 or casing 26 and the ligament 22. This allows precise control of clearance and preload. The ability to shim the damper simplifies field adjustments, which are not possible with prior art integral dampers.

Another advantage is that the doweling between the ligament 22 and the casing 26 (or bearing retainer) allows disassembly for inspection and precise re-assembly.

Another advantage is that the doweling between the inner structure 24 and the ligament 22 allows interchangeability and replacement of a worn or damaged inner structure that is not possible with prior art integral dampers. This is critical for large size bearing support structures. Furthermore, the inner structure 24 can be removed, repaired and then reinstalled.

Another advantage is that since the ligaments 22 are made separately and then assembled in the casing 26, end seals (not shown) need not be separate components.

The use of modular dampers allows the damper inside ring or outside ring to be made integral with the end seals or thrust bearing to reduce the number of parts, and thus reduce the cost compared to an EDM wire cut damper. This is because the cutting wire in an EDM process cuts everything in the line of sight, much like a band saw. Undercuts are not possible. Furthermore, combination dampers and thrust bearings can also be made integral (unlike wire cut EDM bearing supports) by making the casing 26 and the thrust cap or plate (not shown) as one piece.

An advantage is that the ligaments 22 can be accessed for inspection and for removing all the sharp edges. The ligament 22 can be easily shot-peened to relieve the stresses caused by the recast layer created during wire EDM or caused by conventional manufacturing processes.

Another advantage is that the damper 20 allows axial tilt capability that is beneficial in many rotating equipment applications. Long dampers supporting long and heavy rotors with significant sag between bearing supports will require the dampers to provide some axial flexibility or axial tilt. Two rows of ligaments can thus be used one softer and one stiffer which will allow tilt along the direction of the softer ligament.

FIG. 5 of my prior U.S. Pat. No. 6,170,989 shows the preferred method of making a blank for the ligament 22, 42, 70, 72, or 90 of the present invention. A turning operation machines both a circular inner diameter and a concentric outside diameter at the same time, thus forming a ring-shaped member. The member is then placed in a mill where all the holes on the inner diameter and outer diameter are drilled and the member is split along radial lines to form ligament blanks. The final milling removes the material indicated by the cross-hatching, thus defining the flexible center section or web 42B and 42B and creating the ligament 22. The finished ligament 22, 42, 70, 72 or 90 is then assembled with the inner structure 24 and doweled. The inner structure 24 and ligament 22, 42, 70, 72 or 90 are then assembled to the casing 26 or a retainer, and an inner diameter or bore of the inner structure 24 is machined to ensure the concentricity of the bore with an outer diameter of the casing 26. The inner structure 24 and ligament 22, 42, 70, 72 or 90 are then disassembled to permit the insertion of shims 50. This allows precise control and adjustment of the relative location of the inner structure 32 within the casing 26.

The ligament 22, 42, 70, 72, or 90 includes an inner flange 36 and outer flange 40, and a web 22 which are one contiguous lamination of shims forming a member with a Z-shape, L-shape, S-shape, or any shape that allows flexing. Elastomeric film may be disposed between the laminations of the ligament to increase the internal friction between the shims by increasing the resistance to shear forces, and thus increase the damping effectiveness of the ligament. In a preferred embodiment, the outer flange, the inner flange, and the at least one web are comprised of a single lamination of flexible shims which each form a portion of the Z-shaped, L-shaped, S-shaped member. It should be understood, however, that the shape may vary. For example, the inner flange, outer flange and web of the laminated ligament may form an integral accordion-shaped member as shown in FIG. 4. Limit stops can be placed between any number of the accordion shaped or any ligament to control the amount of deflection and vary the stiffness.

Although illustrative embodiments of the invention have been shown and described, a wide range of modification, change, and substitution is contemplated in the foregoing disclosure and in some instances; some features of the present invention may be employed without a corresponding use of the other features. Accordingly, it is appropriate that the appended claims be construed broadly and in a manner consistent with the scope of the invention. For example, a number of methods of manufacturing the dampers of the present invention are also contemplated. The selection of a particular method of manufacturing depends largely on the volume of the particular damper to be manufactured and the materials used. In low volume applications, or when it is desired to produce prototypes for testing and/or production of molds or the like, the dampers are preferably manufactured from metallic cylindrical blanks such as heavy wall tubing or other journals which are machined to provided radial and/or facing bores or grooves and formed with radial cuts or slits through either numerically controlled electrical discharge manufacturing techniques, numerically controlled laser cutting techniques, or numerically controlled water-jet cutting. In intermediate volumes, the dampers of the present invention are preferably manufactured using an investment casting method in accordance with the present invention. In high volume applications, the dampers of the present invention can be manufactured using a wide variety of materials such as plastics, ceramics, powdered and non-powdered metals, and composites. In high volume applications, a number of manufacturing methods, including injection molding, casting, powdered metal, die casting, and extrusion, can be economically employed. The dampers of the present invention can be formed in a shape, which is easily moldable. In short, the present invention relates to dampers having modular flexible ligaments, which enable the dampers to perform significantly, better than known damping methods and which can be manufactured at a lower cost than such dampers.

I claim:

1. A modular flexible ligament damper comprising:
   a. an inner structure with a central axis and an outer cylindrical surface, wherein an inner surface of said inner structure is configured to engage a bearing such that said bearing may move relative to said damper, and wherein said bearing is configured to engage a rotatable shaft;
   b. a casing with an inner cylindrical surface, wherein the casing is positioned around the inner structure; and
   c. a modular ligament comprised of an inner flange and an outer flange connected by a web, wherein the inner flange is selectively engageable with the inner structure and the outer flange is selectively engageable with the casing to support the inner structure within the casing and to permit substantially free orbital movement of the inner structure on a plane substantially perpendicular to the axis of the inner structure, wherein the modular ligament extends only around a portion of periphery of the inner structure.

2. The damper of claim 1 wherein at least one shim is disposed between the inner flange and the inner structure to adjust the relative position of the casing and the inner structure.

3. The damper of claim 1 wherein at least one shim is disposed between the outer flange and the casing to adjust the relative position of the casing and the inner structure.

4. The damper of claim 1 wherein an annulus formed between the outer cylindrical surface of the inner structure and the inner cylindrical surface of the casing is filled with a fluid which dampens the orbital movement of the inner structure.

5. The damper of claim 1 wherein fasteners and locating components connect and align the inner flange to the inner structure and the outer flange to the outer casing to permit disassembly and reassembly of the damper.

6. The damper of claim 1 wherein fasteners and locating components connect and align the inner flange to the inner structure and the outer flange to the casing to permit disassembly and reassembly of the damper, wherein the locating components are cylindrical pins perpendicular to the axis of the inner structure.

7. The damper of claim 1 wherein the outer flange, inner flange, and the web are integrally formed.

8. The damper of claim 1 wherein the web is straight and does not intersect the axis of the inner structure for flexing in a radial direction relative to the axis of the inner structure.

9. The damper of claim 1 wherein the web is curved to permit radial compression in the web.

10. The damper of claim 1, further including a fixed restraint adjacent an intermediate portion of the web to limit buckling of the web.

11. The damper of claim 1 wherein the ligament is comprised of a plurality of laminations.

12. The damper of claim 1 wherein the ligament includes a plurality of spaced apart webs that permit fluid to flow therebetween.

13. The damper of claim 1 wherein the ligament is Z shaped for flexing in a radial direction relative to the axis of the inner structure.

14. The damper of claim 1 wherein the ligament is accordion shaped for flexing in a radial direction relative to the axis of the inner structure.

15. The damper of claim 1, further including a recess on the inner surface of the casing, wherein the ligament is positioned in the recess for minimizing a gap between the inner structure and the outer casing.

16. The damper of claim 1, further including a plurality of additional ligaments evenly arranged radially around the inner structure to support the inner structure within the casing, and additional recesses on the inner surface of the outer casing, wherein a portion of the additional ligaments are positioned in the additional recesses for minimizing a gap between the inner structure and the outer casing.

17. The damper of claim 1, further comprising a plurality of additional ligaments evenly arranged radially around the inner structure and positioned between the inner structure and the casing.

18. The damper of claim 10 wherein the fixed restraint is further defined as being integrally formed in the casing.

19. A damper comprising:
   a. an inner structure with a central axis and an outer cylindrical surface, wherein an inner surface of said inner structure is configured to engage a bearing such that said bearing may move relative to said damper, and wherein said bearing is configured to engage a rotatable shaft;
   b. a casing with an inner cylindrical surface, wherein the casing is positioned around the inner structure;
   c. a modular ligament positioned between the inner structure and the casing and extending along only a portion of the inner cylindrical surface, wherein the modular ligament comprises:
      i. an inner flange configured to selectively engage the inner structure such that the modular ligament may be securely engaged with the inner structure via the inner flange, and such that the inner structure may be completely disengaged from the modular ligament via disengagement of the inner flange;
      ii. an outer flange configured to selectively engage the casing such that the modular ligament may be securely engaged with the casing via the outer flange, and such that the casing may be completely disengaged from the modular ligament via disengagement of the outer flange; and,
      iii. a web connecting the inner flange to the outer flange, wherein the modular ligament supports the inner structure within the casing, and wherein the modular ligament allows a predetermined amount of relative motion between the inner structure and the outer structure in a dimension substantially perpendicular to the central axis.

\* \* \* \* \*